United States Patent
Kawabata et al.

(10) Patent No.: US 10,402,242 B2
(45) Date of Patent: Sep. 3, 2019

(54) ANNOTATION APPARATUS, ANNOTATION METHOD, AND COMPUTER-READABLE RECORDING MEDIUM

(71) Applicant: NIPPON TELEGRAPH AND TELEPHONE CORPORATION, Chiyoda-ku (JP)

(72) Inventors: Yuto Kawabata, Musashino (JP); Takeshi Masuda, Musashino (JP); Kouki Nakanishi, Musashino (JP); Ikuko Takagi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 38 days.

(21) Appl. No.: 15/509,086

(22) PCT Filed: Sep. 3, 2015

(86) PCT No.: PCT/JP2015/075115
§ 371 (c)(1),
(2) Date: Mar. 6, 2017

(87) PCT Pub. No.: WO2016/039254
PCT Pub. Date: Mar. 17, 2016

(65) Prior Publication Data
US 2017/0277579 A1    Sep. 28, 2017

(30) Foreign Application Priority Data

Sep. 8, 2014   (JP) ................................ 2014-182556

(51) Int. Cl.
*G06F 9/54*   (2006.01)
*G06F 3/048*   (2013.01)
(Continued)

(52) U.S. Cl.
CPC .............. *G06F 9/547* (2013.01); *G06F 3/048* (2013.01); *G06F 8/73* (2013.01); *G06F 9/451* (2018.02);
(Continued)

(58) Field of Classification Search
None
See application file for complete search history.

(56) References Cited

U.S. PATENT DOCUMENTS

2003/0145281 A1* 7/2003 Thames .................... G06F 8/71
715/205
2006/0005117 A1* 1/2006 Yamashita ............ G06F 17/241
715/205
(Continued)

FOREIGN PATENT DOCUMENTS

JP   2002-304314 A   10/2002
JP   2010-15504 A    1/2010
(Continued)

OTHER PUBLICATIONS

Office Action dated Aug. 8, 2017 in Japanese Patent Application No. 2016-547412 (with English translation).
(Continued)

*Primary Examiner* — Tuan C Dao
(74) *Attorney, Agent, or Firm* — Oblon, McClelland, Maier & Neustadt, L.L.P.

(57) ABSTRACT

An annotation apparatus includes an annotation DB, a screen state acquisition monitor unit, and an external collaboration program call unit. The annotation DB stores therein an annotation object and an annotation rule applicable to each of windows of the annotation object in an associated manner. The screen state acquisition monitor unit identifies an active window from among the windows. The external collaboration program call unit calls, when an
(Continued)

annotation rule associated with the active window that has been identified by the screen state acquisition monitor unit is present in the annotation DB and when the annotation object is selected, an external program in accordance with the annotation rule.

5 Claims, 7 Drawing Sheets

(51) Int. Cl.
*G06F 8/73* (2018.01)
*G06F 9/451* (2018.01)
*G06Q 10/00* (2012.01)
*H04L 29/06* (2006.01)

(52) U.S. Cl.
CPC .............. *G06F 9/542* (2013.01); *G06F 9/546* (2013.01); *G06Q 10/00* (2013.01); *H04L 63/102* (2013.01); *H04L 67/38* (2013.01)

(56) References Cited

U.S. PATENT DOCUMENTS

| | | | | |
|---|---|---|---|---|
| 2007/0038610 | A1* | 2/2007 | Omoigui | H04L 29/06 |
| 2010/0011377 | A1* | 1/2010 | Imai | G06F 9/445 |
| | | | | 719/318 |
| 2011/0258216 | A1* | 10/2011 | Supakkul | G06F 3/04812 |
| | | | | 707/769 |
| 2011/0301996 | A1* | 12/2011 | Johnson | G06Q 10/06 |
| | | | | 705/7.26 |
| 2013/0182147 | A1 | 7/2013 | Kimoto et al. | |
| 2013/0326363 | A1* | 12/2013 | Meintanis | G06F 17/30572 |
| | | | | 715/750 |
| 2014/0032691 | A1* | 1/2014 | Barton | H04L 41/00 |
| | | | | 709/206 |
| 2014/0157288 | A1* | 6/2014 | Wong | G06F 11/3476 |
| | | | | 719/318 |

FOREIGN PATENT DOCUMENTS

| | | |
|---|---|---|
| JP | 2010-282587 A | 12/2010 |
| JP | 2012-9069 A | 1/2012 |
| JP | 2013-025554 A | 2/2013 |
| WO | WO 2014/002812 A | 1/2014 |

OTHER PUBLICATIONS

"DocuWorks™ 5.0 User's Guide" Fuji Xerox, 2002, 18 pages (with partial English translation).

International Search Report dated Oct. 6, 2015 in PCT/JP2015/075115 filed Sep. 3, 2015.

Yeh, Tom et al., "Sikuli: Using GUI Screenshots for Search and Automation," UIST '09 proceedings, Oct. 2009, 11 pages.

Yeh, Tom et al., "Creating Contextual Help for GUIs Using Screenshots," UIST '11 proceedings, Oct. 2011, 13 pages.

Kawabata, Yuto et al., "An image-based annotation technique to overlay users' knowledge on existing systems," APNOMS, 2012, 5 pages.

Kawabata, Yuto et al., "Annotation Technology Progress and Evaluation for More Accurate Operations in Global Network Environment," NTT, 2014, 16 pages.

Office Action dated Mar. 6, 2018 in Japanese Patent Application No. 2016-547412 (with English language translation).

* cited by examiner

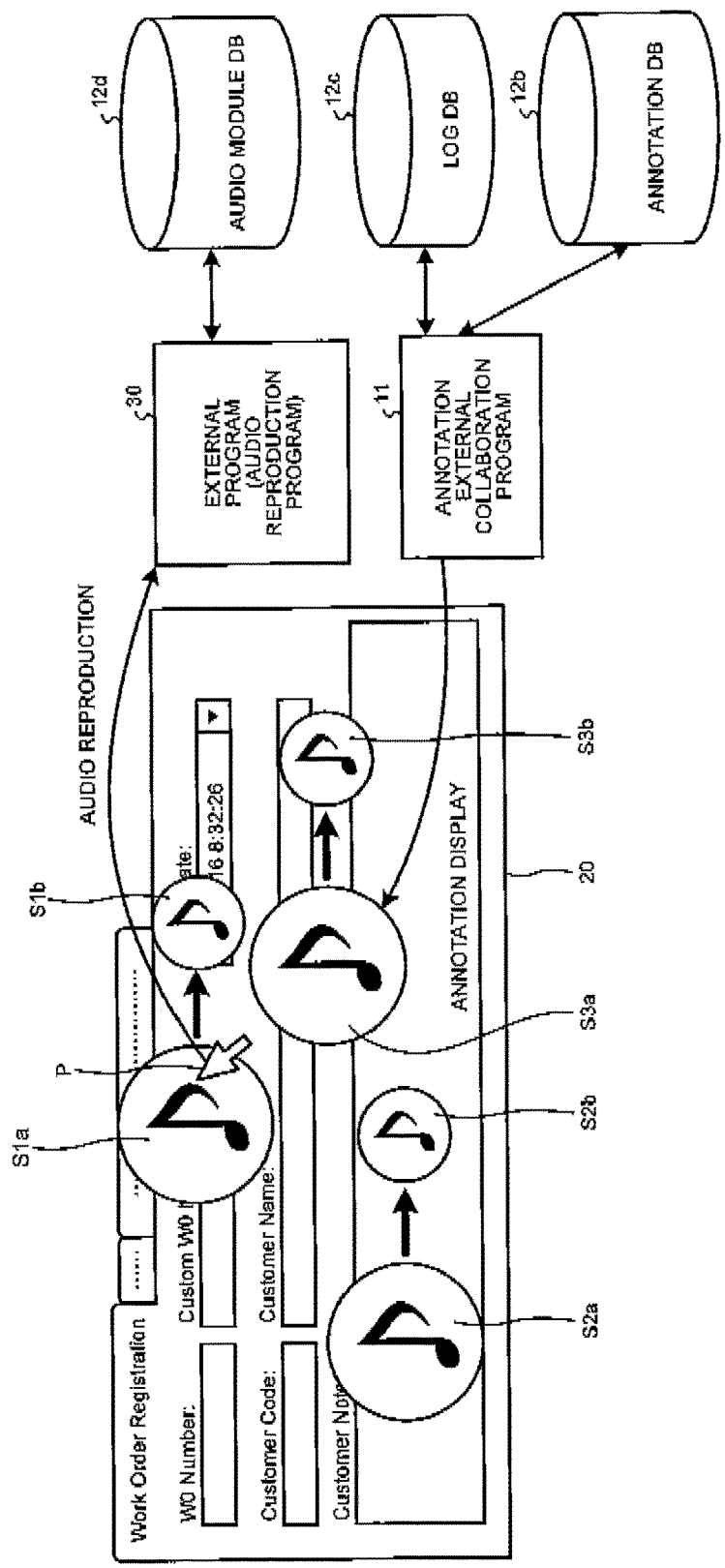

ANNOTATION APPARATUS, ANNOTATION METHOD, AND COMPUTER-READABLE RECORDING MEDIUM

TECHNICAL FIELD

The present invention relates to an annotation apparatus, an annotation method, and an annotation program.

BACKGROUND ART

Job systems have hitherto been used in which users operate terminal devices to perform jobs. In such systems, directly describing a program for calling job knowledge or an external program with respect to a graphical user interface (GUI) as an operation object involves reorganization of the job system and has thus been difficult. Should an application programming interface (API) be available for such a job system, the API requests that the user understand each individual API provided for a variety of job systems and set an adapter suitable for an architecture of each job system before the user can perform the above description. The API thus offers poor versatility.

To perform the above description, users have taken an approach of accumulating job knowledge using text or a knowledge sharing tool such as a wiki, or of preparing a script for calling an external program to thereby individually set a shortcut, in addition to the above-described job system.

The users, however, find difficulty in appropriately describing timing at which to refer to the job knowledge in the text described in the knowledge sharing tool in time with a transition from one application window to another. Additionally, because the job knowledge has been converted to primary information such as text, the job system encounters difficulty in providing job knowledge in a format that provides a link with an actual operation on a 2D screen and in referring to an external program with the provision of the job knowledge as an invoker.

In view of the foregoing situation, Non Patent Document 1 discloses a technique with which the job system including no API directly describes a GUI display image within a virtual script to thereby be able to describe an automatic operation program in a simplified manner without modifying an existing system. Non Patent Document 2 discloses a technique that displays text using the foregoing technique. Additionally, Non Patent Document 3 discloses a technique that limits an image recognition target to a forefront display window only and monitors a window handle of the window to thereby solve the problem with Non Patent Document 1. Non Patent Document 4 discloses a technique that sophisticates the annotation offering improved practical usability over the foregoing techniques.

CITATION LIST

Non Patent Citation

Non Patent Document 1: "Sikuli: Using GUI Screenshots for Search and Automation", Tom Yeh, Tsung-Hsiang Chang, Robert C. Miller (UIST '09 proceeding)

Non Patent Document 2: "Creating Contextual Help for GUIs Using Screenshots", Tom Yeh, Tsung-Hsiang Chang, Bo Xie, Greg Walsh, Ivan Watkins, Krist Wong-suphasawat, Man Huang, Larry S. Davis, and Ben Bederson (UIST '11 proceeding)

Non Patent Document 3: "An image-based annotation technique to overlay users' knowledge on existing systems", Yuto Kawabata, et al., pp. 1-4, 25-27, September APNOMS, 2012.

Non Patent Document 4: "Annotation Technology Progress and Evaluation for More Accurate Operations in Global Network Environment", Yuto Kawabata, et al., NOMS, 2014.

SUMMARY OF INVENTION

Technical Problem

Unfortunately, the above-described techniques can involve the following problems. Specifically, while an annotation object (e.g., annotation message, annotation icon) can be displayed with respect to an operation screen image, calling an external program from the annotation object is difficult. Thus, the known job systems have difficulty in cooperating with an external program to operate an application having an annotation function (program that displays the annotation object).

The disclosed technique has been made in view of the foregoing situation and it is an object of the disclosed technique to provide an annotation apparatus, an annotation method, and an annotation program that can easily call an external program from an annotation object.

Solution to Problem

To solve the above problem and attain the object, an annotation apparatus disclosed in this application, according to an aspect, includes: a storage that stores an annotation object and an annotation rule applicable to each of windows of the annotation object in an associated manner; an identifier that identifies an active window from among the windows; and a caller that, when an annotation rule associated with the active window that has been identified by the identifier is present in the storage and when the annotation object is selected, calls an external program in accordance with the annotation rule.

An annotation method disclosed in this application, according to an aspect, is performed in an annotation apparatus, and the annotation method includes: a step of storing, in a storage, an annotation object and an annotation rule applicable to each of windows of the annotation object in an associated manner; a step of identifying an active window from among the windows; and when an annotation rule associated with the active window that has been identified at the step of identifying is present in the storage and when the annotation object is selected, a step of calling an external program in accordance with the annotation rule.

Additionally, an annotation program disclosed in this application, according to an aspect, causes a computer to perform: a step of storing, in a storage, an annotation object and an annotation rule applicable to each of windows of the annotation object in an associated manner; a step of identifying an active window from among the windows; and when an annotation rule associated with the active window that has been identified at the step of identifying is present in the storage and when the annotation object is selected, a step of calling an external program in accordance with the annotation rule.

Advantageous Effects of Invention

The annotation apparatus, the annotation method, and the annotation program disclosed in the present application achieve an effect of being able to easily call an external program from an annotation object.

BRIEF DESCRIPTION OF DRAWINGS

FIG. 6 is a diagram illustrating how audio is reproduced by a call from an annotation.

EMBODIMENTS FOR CARRYING OUT THE INVENTION

The following details, with reference to the accompanying drawings, an embodiment of an annotation apparatus, an annotation method, and an annotation program disclosed in the present application. It is to be noted that the following embodiment is not intended to limit the annotation apparatus, the annotation method, and the annotation program disclosed in the present application.

Figure 1:
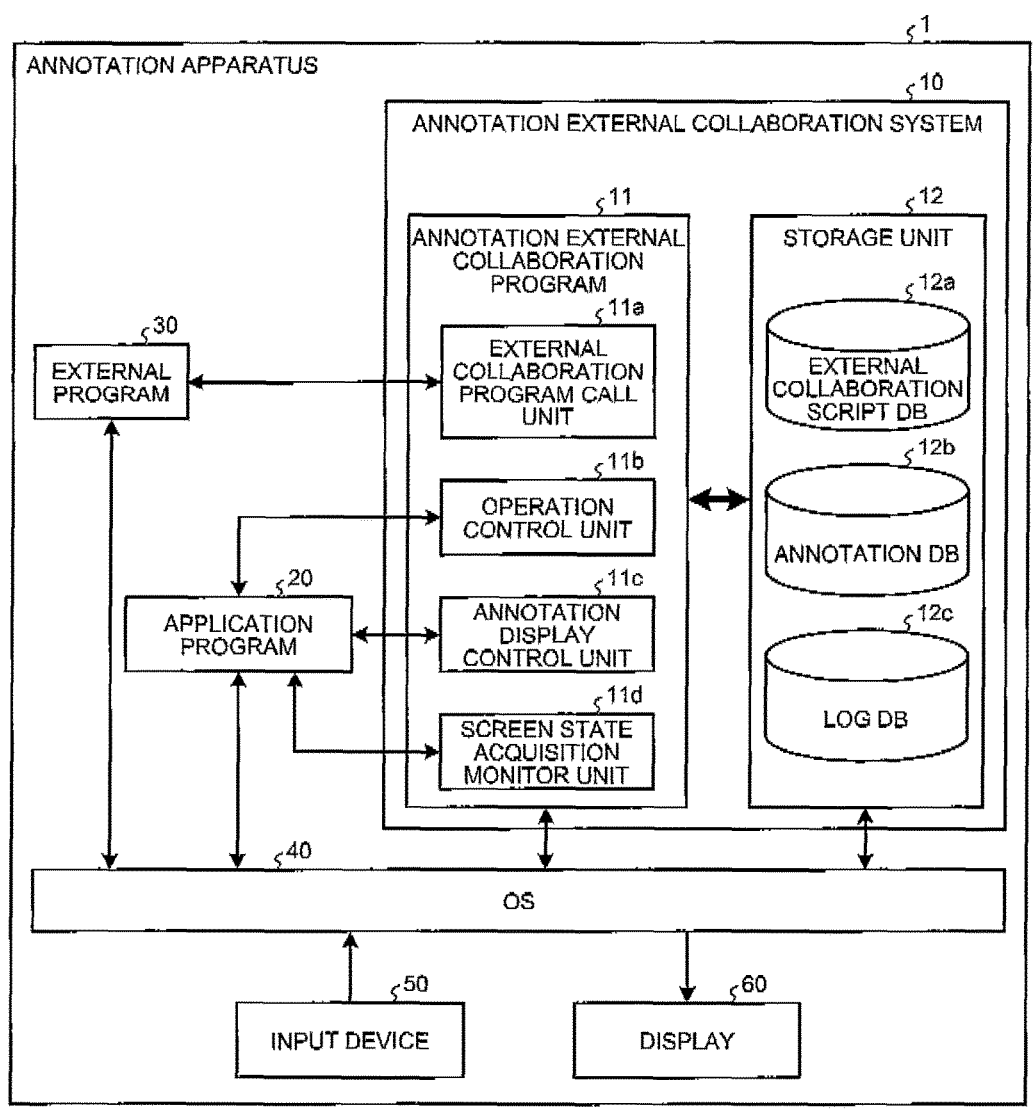
FIG. 1 is a diagram illustrating a configuration of an annotation apparatus.

The following describes a configuration of an annotation apparatus according to an embodiment disclosed in the present application. FIG. 1 is a diagram illustrating a configuration of this annotation apparatus 1. As illustrated in FIG. 1, the annotation apparatus 1 includes an annotation external collaboration system 10, an application program 20, an external program 30, an operating system (OS) 40, an input device 50, and a display 60. Each of these elements is connected with each other so as to be capable of inputting and outputting signals and data unidirectionally or bidirectionally.

The annotation external collaboration system 10 operates on the OS 40 and includes an annotation external collaboration program 11 and a storage unit 12. The annotation external collaboration program 11 includes an external collaboration program call unit 11a, an operation control unit 11b, an annotation display control unit 11c, and a screen state acquisition monitor unit 11d. The storage unit 12 includes an external collaboration script data base (DB) 12a, an annotation DB 12b, and a log DB 12c.

The external collaboration program call unit 11a controls the external program 30 that operates on the OS 40. The external collaboration program call unit 11a further refers to the external collaboration script DB 12a that has been registered by a user and causes a target application program 20 to execute various external programs 30. For example, the external collaboration program call unit 11a calls, for the external program 30, an API for operating the external program 30, and transmits to the external program 30 a command message from a command line interface (CLI) to the external program 30 and text that uses a clipboard standard with the OS. Additionally, the external collaboration program call unit 11a instructs the external program 30 to execute a program for starting a browser or reproducing an audio file, to transmit a COM message to an Office document, and to execute a program script such as a Visual Basic (VB) script.

The operation control unit 11b acquires from the application program 20 content (e.g., image data, GUI tree, HTML tag information, and DOM information) for editing an annotation. Similarly, the annotation display control unit 11c acquires from the application program 20 content for displaying an annotation. The screen state acquisition monitor unit 11d identifies an active window from among a plurality of windows. The screen state acquisition monitor unit 11d acquires window information in the application program 20 by polling and changes annotations retained in the annotation DB 12b and the log DB 12c.

The application program 20 operates on the OS 40 and provides the operation control unit 11b and the annotation display control unit 11c with content for editing and displaying annotations. The external program 30 operates on the OS 40 and is called by the external collaboration program call unit 11a with an action on an annotation as an invoker.

Figure 2:
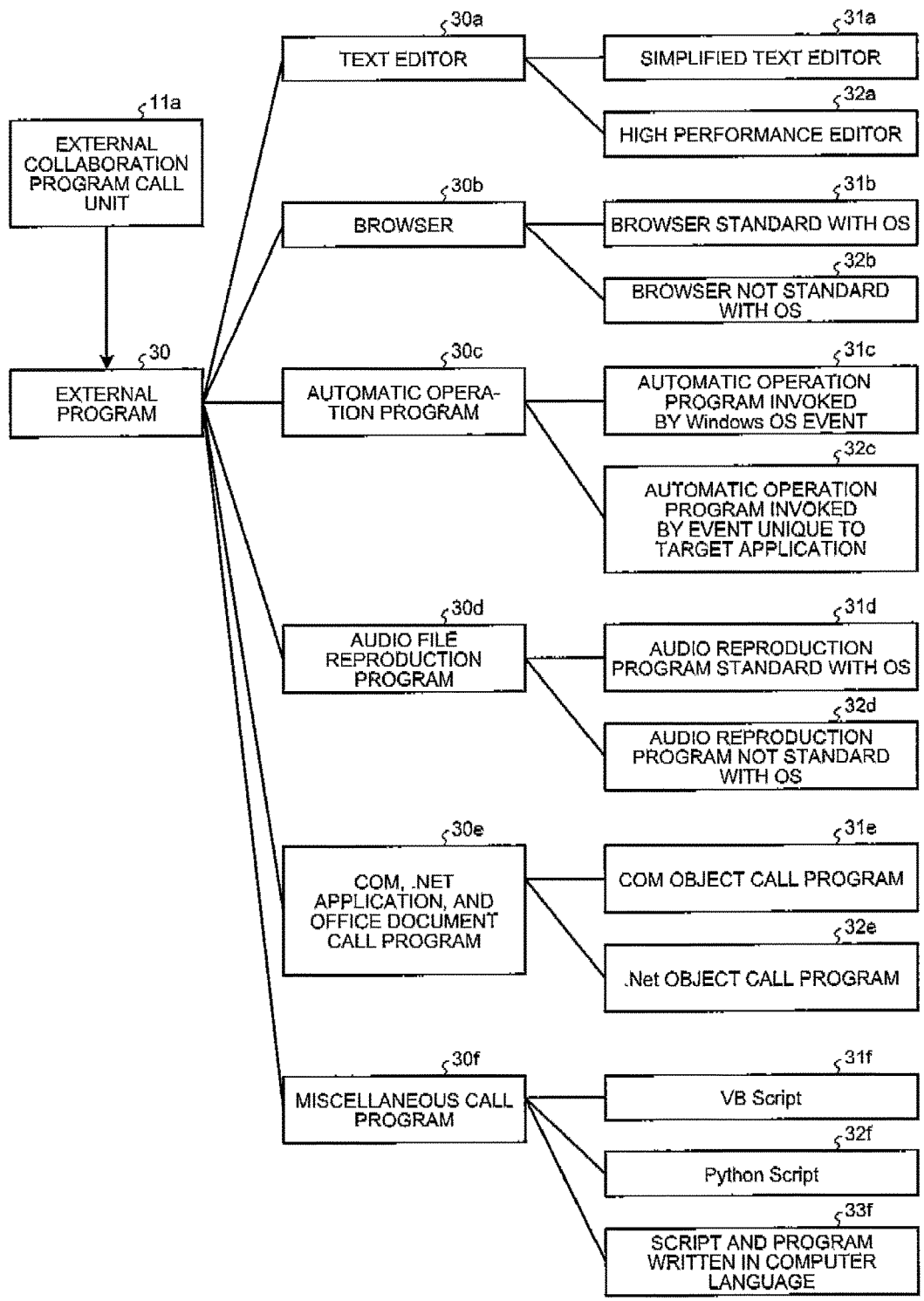
FIG. 2 is a diagram illustrating an exemplary external program that is called by an external collaboration program call unit.

FIG. 2 is a diagram illustrating an example of the external program 30 that is called by the external collaboration program call unit 11a. As illustrated in FIG. 2, the external program 30 is, for example, a text editor 30a such as a memo pad 31a and a high performance editor 32a. The text editor 30a is used for, for example, copying and pasting, and editing an annotation display text. The external program 30 is, for example, a browser 30b such as a browser standard with OS 31b or a browser not standard with OS 32b. Calling the browser 30b enables, for example, referencing of Web content, referencing of a manual of an annotation target application, and an operation to be performed on a Web-based job system following an operation of the annotation target application.

The external program 30 is, for example, an automatic operation program 30c such as an automatic operation program invoked by a Windows (registered trademark) OS event 31c and an automatic operation program invoked by an event unique to the annotation target application 32c. The automatic operation program 30c is used for, for example, achieving an one stop operation that takes an action that may be performed, for example, by a user to refer to and click an annotation as a trigger for the automatic operation. One stop operation represents application to an operation job area of a concept of one stop services that allow all requested related jobs to be completed through a procedure performed one time. The one stop operation enables a group of operation jobs to be performed through operations performed once. With service providers, for example, the operation job is represented in these years by a business of operating and maintaining a network cloud application. The operation job also includes operations, in a broad sense, relating to a variety of businesses in other business entities. Additionally, the external program 30 is, for example, an audio file reproduction program 30d such as an audio reproduction program standard with OS 31d and an audio reproduction program not standard with OS 32d. The audio file reproduction program 30d is used, for example, for reproduction of audio using as a trigger an action that may be performed, for example, by a user to refer to and click an annotation. The user listens to the audio to thereby be able to understand how to use the annotation target application or how to perform a job.

The external program 30 is, for example, an Office document call program 30e such as a COM object call program 31e and a .Net object call program 32e. The COM, .Net application, and Office document call program 30e is used for, for example, starting an Office document or a Windows (registered trademark) application that takes as a trigger an action that may be performed, for example, by a user to refer to and click an annotation. The user may register in advance a reference document or a Windows application by associating the reference document or the Windows application with an annotation, to thereby be readily able to refer to the reference document or the Windows application while using the annotation target application. Additionally, the external program 30 is, for example, a miscellaneous call program 30f such as a VBScript 31f, a Python Script 32f, and a miscellaneous call program 30f. The miscellaneous call program 33f is executed, for example, using an annotation as a trigger.

The OS 40 generally manages and controls the annotation apparatus 1 as a computer to thereby provide the user with an operating environment. The input device 50 includes, for example, a keyboard, a mouse, and a touch panel. The input device 50 converts an operating input by the user to a corresponding signal and outputs the signal to each of the annotation external collaboration system 10, the application program 20, and the external program 30 via the OS 40. The display 60 includes, for example, a liquid crystal display (LCD) and an electro luminescence display (ELD). The display 60 displays data input thereto via the OS 40 from each of the annotation external collaboration system 10, the application program 20, and the external program 30.

Figure 3:
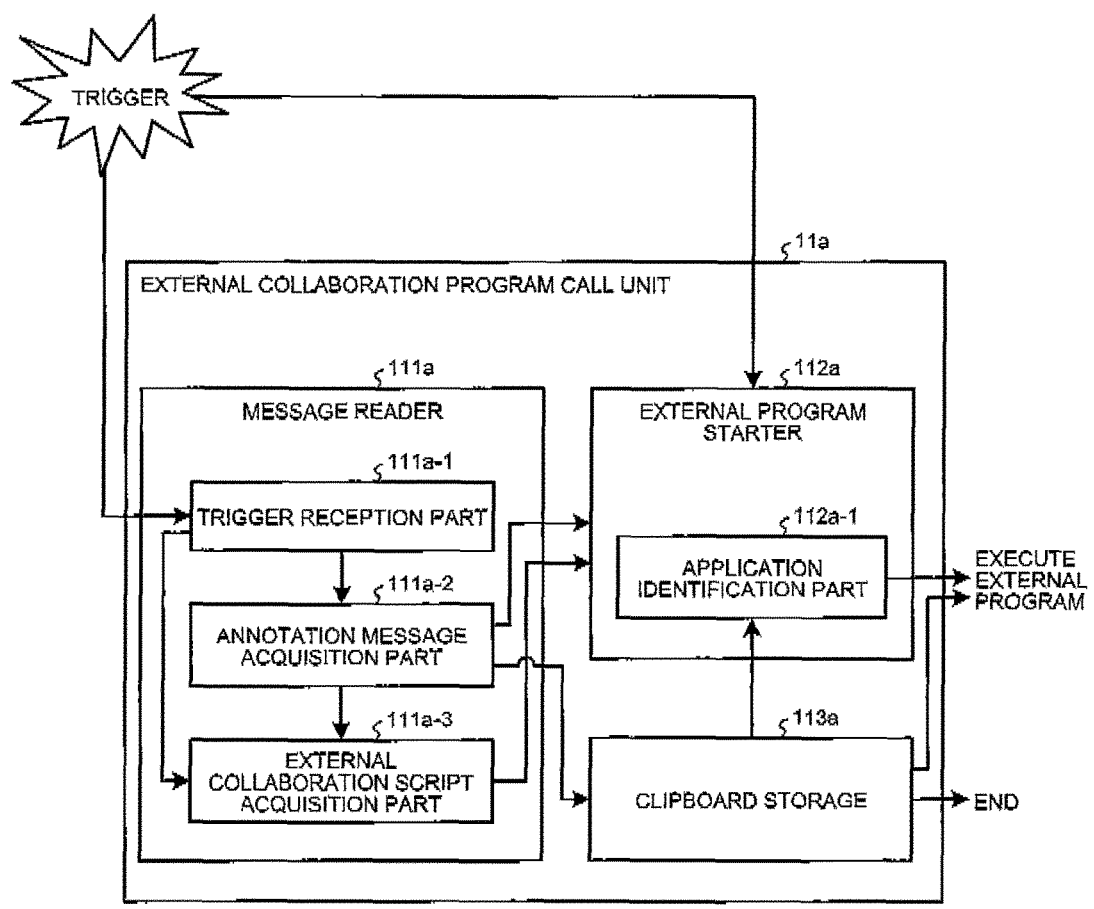
FIG. 3 is a diagram illustrating a configuration of the external collaboration program call unit.

FIG. 3 is a diagram illustrating a configuration of the external collaboration program call unit 11a. As illustrated in FIG. 3, when an action is performed on an annotation, a trigger calls a trigger reception part 111a-1 of a message reader 111a or an application identification part 112a-1 of an external program starter 112a. It is noted that the action performed on the annotation is, for example, the user's clicking or double-clicking any annotation message and the user's clicking or double-clicking any annotation icon. The action performed on the annotation may even be the user's performing a mouse-over operation of any annotation message or any annotation icon.

The trigger reception part 111a-1, having received the trigger, instructs an annotation message acquisition part 111a-2 and an external collaboration script acquisition part 111a-3 to output an annotation message to the application identification part 112a-1. The application identification part 112a-1, with the input of the annotation message as an invoker, executes the external program 30. In contrast, when the external program starter 112a is directly called from the trigger, the application identification part 112a-1 executes the external program 30 without having an intervention by the annotation message.

Additionally, the application identification part 112a-1 causes text data to be stored in a clipboard storage 113a. Using the text data stored in the clipboard storage 113a, the application identification part 112a-1 executes the external program 30 and transmits text that uses the clipboard standard with the OS, for example.

It is noted that the external program starter 112a identifies a specific external program 30 to be started from the annotation message based on contents of the annotation message, a protocol such as a hyper text transfer protocol (HTTP) and a file transfer protocol (FTP), and a file extension. The external program starter 112a may select call candidates from among a plurality of external programs 30 registered in advance and, from among the call candidates, select an external program 30 corresponding to a result of the above identification to execute the external program 30.

Meanwhile, the external collaboration script acquisition part 111a-3 uses as a trigger a message or an action input from the trigger reception part 111a-1 or the annotation message acquisition part 111a-2 to thereby call a Web site from a uniform resource locator (URL). Additionally, the external collaboration script acquisition part 111a-3 starts a file using a file path of an audio file, an Office document file, an execution file, or any other type of file.

The following describes operations.

Figure 4:
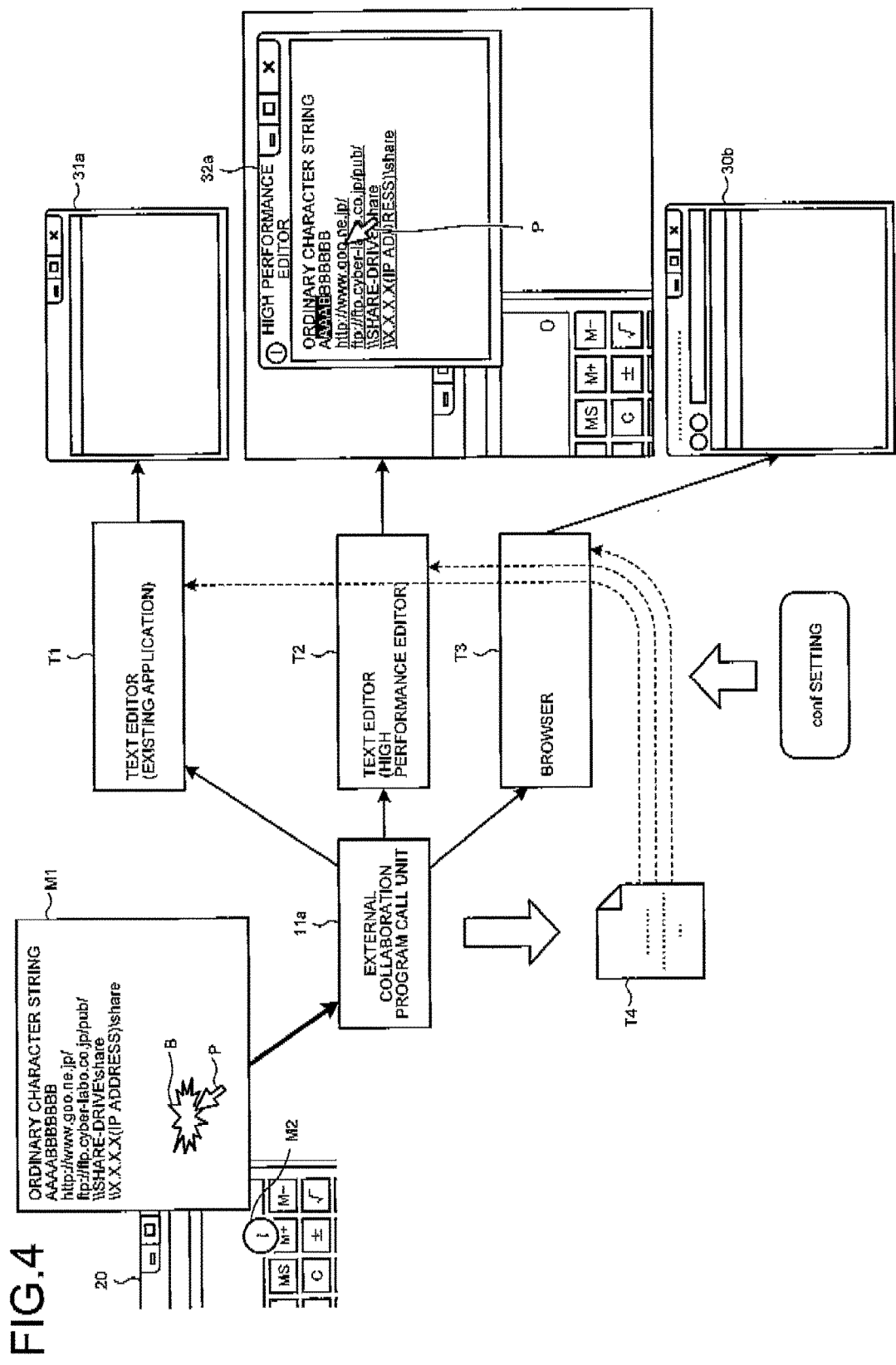
FIG. 4 is a diagram for illustrating operations of the annotation apparatus.

FIG. 4 is a diagram for illustrating operations of the annotation apparatus 1. As illustrated in FIG. 4, the external collaboration program call unit 11a calls an external program (e.g., the memo pad 31a, the high performance editor 32a, and the browser 30b), while retaining display details of an annotation message M1 in a text file T4 or the clipboard using text editors T1 and T2 and a browser T3. For example, the external collaboration program call unit 11a duplicates and displays the annotation message M1 in the text editors T1 and T2 to thereby enable a copy and paste operation of the annotation message M1 and display of a hyperlink.

It is here noted that the text editors T1 and T2 and the browser T3, while displaying a character string as a text, have a function of automatically accessing and displaying Web content, such as a Web page, disposed beyond a URL of a character string of "http://", if such a character string is included. If a plurality of character strings, such as "http://" and "¥¥c:¥aaa", are included, the text editors T1 and T2 and the browser T3 have a function of interpreting that portion as a link and displaying linked data. Conf setting, specifically, a setting file, registry, or other setting device may be used to specify in advance a specific external program in a specific display mode.

When the user clicks a balloon B via a mouse pointer P, the trigger reception part 111a-1 of the annotation apparatus 1 receives the trigger and the annotation message acquisition part 111a-2 selects and copies all of the annotation message M1. The annotation message acquisition part 111a-2 thereafter pastes and stores the character string of the annotation message M1 in the text file or the clipboard standard with the OS.

The external program starter 112a starts an external program 30 specified in advance and pastes whole or part of the annotation message M1 with respect to the external program 30. Operation of the application identification part 112a-1 after the external program 30 has been started complies with the external program 30.

Figure 5A:
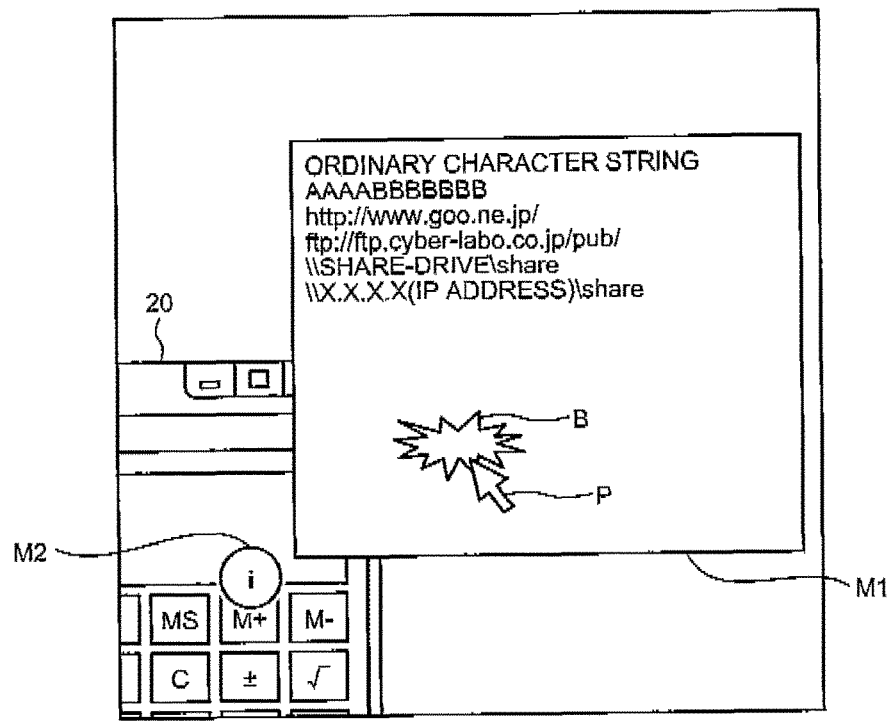
FIG. 5A is a diagram illustrating how an annotation message is clicked.
Figure 5B:
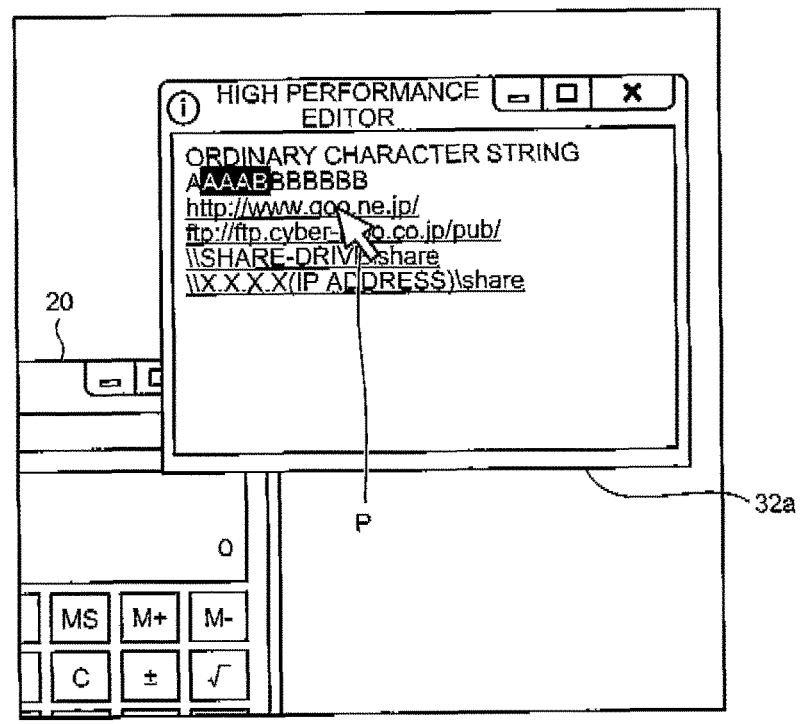
FIG. 5B is a diagram illustrating a dialog screen of a high performance editor opened by a click.

FIG. 5A is a diagram illustrating how the annotation message M1 is clicked. As illustrated in FIG. 5A, clicking the balloon B via the mouse pointer P by the user opens a dialog screen of the high performance editor 32a. FIG. 5B is a diagram illustrating the dialog screen of the high performance editor 32a opened by the click. In FIG. 5B, the user can operate the character string displayed in the dialog screen. As illustrated in FIG. 5B, when the dialog screen of the high performance editor 32a appears, the user can perform such operations as opening a browser from a URL link or opening a Win path "¥¥129.60.73.40 ¥share", in addition to a copying operation.

While FIGS. 5A and 5B each illustrate an example in which only one dialog screen appears, a plurality of dialog screens may be displayed in parallel. Specifically, the click of the balloon B via the mouse pointer P by the user may be arranged to open a dialog screen of each of the memo pad 31a and the browser 30b as the external programs 30, in addition to the dialog screen of the high performance editor 32a. When the dialog screen of the memo pad 31a is displayed, the user can perform a copying operation by selecting a character string. When the dialog screen of the browser 30b is displayed, the user can perform such an operation as opening a Web site through one action.

FIG. 6 is a diagram illustrating how audio is reproduced by a call from an annotation. The annotation apparatus 1 uses as an invoker a click of an annotation object (message or icon) displayed on a job system in a desktop environment and causes the annotation external collaboration program 11 to call an audio file stored in an audio module DB 12d and to reproduce audio. The abovementioned click may be, for example, a double click or a mouse over.

FIG. 6 illustrates annotation icons S1a, S2a, and S3a for reproducing model-compliant audio, associated with respective annotation icons S1b, S2b, and S3b for reproducing customer-compliant audio. A creator of the annotation sets the annotation icons individually according to the type of audio as enumerated above, so that the user can clearly and readily identify differences in audio to be reproduced before the audio content is reproduced. While the annotation icons S1a, S2a, and S3a and the annotation icons S1b, S2b, and S3b are displayed in an identical display style in FIG. 6, the icons may be displayed, for example, in different sizes, colors, shapes, and patterns and at different positions according to importance or functions of a collaboration destination. For example, the annotation icon having greater importance may be displayed in a greater size or in a more conspicuous color such as red.

As described above, the annotation apparatus 1 includes the annotation DB 12b, the screen state acquisition monitor unit 11d, and the external collaboration program call unit 11a. The annotation DB 12b stores therein the annotation objects (e.g., the annotation message M1 and an annotation icon M2) that are associated with respective annotation rules (e.g., display control method and display mode) applicable to respective annotation object windows. The screen state acquisition monitor unit 11d monitors and identifies an active window from among the windows. The external collaboration program call unit 11a calls the external program 30 according to the abovementioned annotation rules when the annotation rules associated with the active window identified by the screen state acquisition monitor unit 11d are present in the annotation DB 12b and when the annotation object associated with the annotation rules is selected.

In the annotation apparatus 1, during starting of the external program 30, the external collaboration program call unit 11a may output to the external program 30 (e.g., the high performance editor 32a illustrated in FIG. 5B) the annotation message M1 illustrated in FIG. 5A as the annotation object. Additionally, in the annotation apparatus 1, the external collaboration program call unit 11a may use an analysis (e.g., URL, file extension, and protocol) of the annotation message M1 to thereby identify the external program that processes the annotation message M1. The external collaboration program call unit 11a may even identify the program (e.g., the application program 20 as the annotation target application) in which the annotation message M1 is displayed to thereby identify the external program based on the identified program and details of the conf setting. The external collaboration program call unit 11a may still identify the external program based on a combination of the message analysis and the identified annotation target application. The external collaboration program call unit 11a may call the external program 30 based on the result of the identification.

Specifically, the annotation apparatus 1 causes the annotation external collaboration system 10 to function as an interface between the application program 20 (annotation target application) and other external programs 30. The annotation apparatus 1, because of being capable of starting a variety of external programs 30 from annotations, enables such processes as sharing knowledge through audio, displaying a manual and the like via a Web browser or a document, and simplifying input of information to a job system through a copy and paste operation of messages. Thus, the annotation apparatus 1 can achieve supply of job knowledge in a style in accordance with a job process context having an existing job system as a starting point. As a result, labor and time requested for acquiring knowledge can be reduced at, for example, an operation center or a call center, or in a core business system used by all employees. Additionally, the annotation apparatus 1 can promote streamlining of a job process by performing an auto script with the annotation object as a starting point. Thus, sophisticated support can be provided for not only general users, but also operators performing job processes.

Annotation Program

Figure 7:
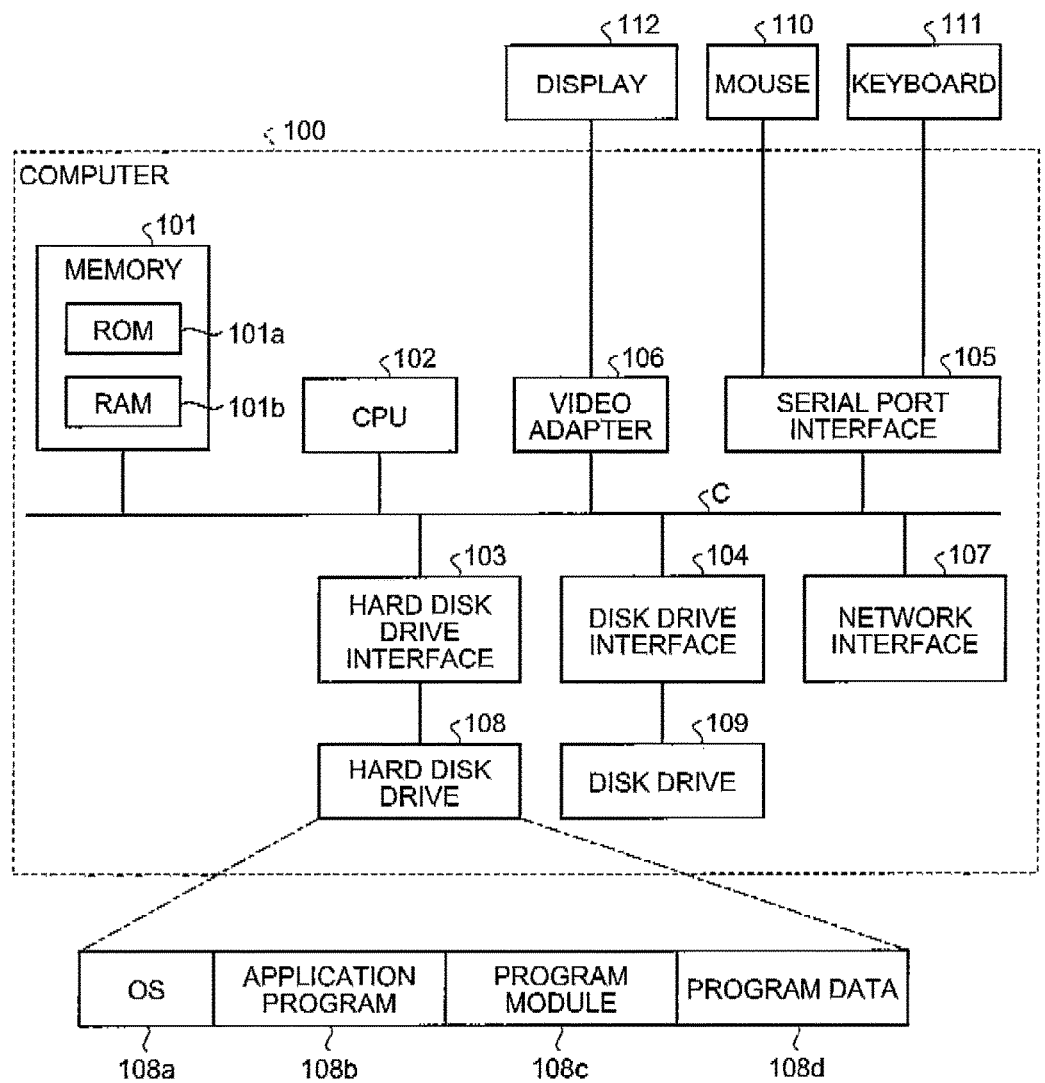
FIG. 7 is a diagram illustrating information processing by an annotation program achieved specifically by a computer.

FIG. 7 is a diagram illustrating information processing by the annotation program achieved specifically by a computer 100. As illustrated in FIG. 7, the computer 100 includes, for example, a memory 101, a central processing unit (CPU) 102, a hard disk drive interface 103, a disk drive interface 104, a serial port interface 105, a video adapter 106, and a network interface 107. These elements are connected by a bus C.

The memory 101 includes, as illustrated in FIG. a read only memory (ROM) 101a and a random access memory (RAM) 101b. The ROM 101a stores therein a boot program for, for example, basic input output system (BIOS). The hard disk drive interface 103 is connected with a hard disk drive 108 as illustrated in FIG. 7. The disk drive interface 104 is connected with a disk drive 109 as illustrated in FIG. 7. A removable recording medium such as a magnetic disk and an optical disk, for example, is inserted in the disk drive 109. The serial port interface 105 is connected with, for example, a mouse 110 and a keyboard 111 as illustrated in FIG. 7. The video adapter 106 is connected with, for example, a display 112 as illustrated in FIG. 7.

It is here noted that, as illustrated in FIG. 7, the hard disk drive 108 stores therein, for example, an operating system (OS) 108a, an application program 108b, a program module 108c, program data 108d, external collaboration objects, annotation objects, log information, and an audio module. Specifically, the annotation program according to the disclosed technique is stored in, for example, the hard disk drive 108 as the program module 108c that describes commands executed by the computer 100. More specifically, the program module 108c that describes various types of procedures for performing information processing identical to the information processing performed by each of the external collaboration program call unit 11a, the operation control unit 11b, the annotation display control unit 11c, and the screen state acquisition monitor unit 11d described with reference to the above embodiment is stored in, for example, the hard disk drive 108. Additionally, data used for information processing by the annotation program is stored as the program data 108d in, for example, the hard disk drive 108. The CPU 102 loads, as necessary, the program module 108c and the program data 108d stored in the hard disk drive 108 onto the RAM 101b and executes the various types of procedures.

The arrangement in which the program module 108c and the program data 108d relating to the annotation program are stored in the hard disk drive 108 is illustrative only and not limiting. For example, the program module 108c and the program data 108d relating to the annotation program may be stored in a removable recording medium and loaded by the CPU 102 via, for example, the disk drive 109. Alternatively, the program module 108c and the program data 108d relating to the annotation program may be stored in another computer that is connected via a network (local area network (LAN) or wide area network (WAN) or the like) and loaded by the CPU 102 via the network interface 107.

The embodiment has been described such that the annotation objects displayed for the application program 20 includes one annotation message M1 and one annotation icon M2 as illustrated in FIG. 5A. Nonetheless, at least either one of the annotation objects may be provided in plurality. In addition, the display style (e.g., position, shape, size, color, and pattern) of each annotation object is not limited to what is illustrated in FIG. 5A.

The elements of the annotation apparatus 1 described above are not necessarily requested to be physically configured as illustrated. Specifically, specific configurations of distribution and integration of each element are not limiting and the elements can be functionally or physically distributed or integrated, in whole or in part, in any unit depending on, for example, load and use conditions. For example, the operation control unit 11b and the annotation display control unit 11c may be integrated with each other into a single element. In contrast, the external collaboration program call unit 11a may be distributed into a portion that calls the external program 30 and a portion that outputs the annotation message M1 to the external program 30. Additionally, the hard disk drive 108 may be connected over a network and a cable as an external device of the annotation apparatus 1.

REFERENCE SIGNS LIST

1 Annotation apparatus
10 Annotation external collaboration system
11 Annotation external collaboration program
11a External collaboration program call unit
11b Operation control unit
11c Annotation display control unit
11d Screen state acquisition monitor unit
12 Storage unit
12a External collaboration script DB
12b annotation DB
12c Log DB
12d Audio module DB
20 Application program
30 External program
30a Text editor
30b Browser
30c Automatic operation program
30d Audio file reproduction program
30e COM, .Net application, and office document call program
30f Miscellaneous call program
40 OS
50 Input device
60 Display
100 Computer
101 Memory
101a ROM
101b RAM
102 CPU
103 Hard disk drive interface
104 Disk drive interface
105 Serial port interface
106 Video adapter
107 Network interface
108 Hard disk drive
108a OS
108b Application program
108c Program module
108d Program data
109 Disk drive
110 Mouse
111 Keyboard
111a Message reader
111a-1 Trigger reception part
111a-2 Annotation message acquisition part
111a-3 External collaboration script acquisition part
112 Display
112a External program starter
112a-1 Application identification part
113a Clipboard storage
B Balloon
C Bus
M1 Annotation message
M2, S1a, S1b, S2a, S2b, S3a, S3b Annotation icon
P Mouse pointer
T1, T2 Text editor
T3 Browser
T4 Text file

The invention claimed is:

1. An annotation apparatus, comprising:
a memory that stores an annotation object and an annotation rule applicable to each of windows of the annotation object in an associated manner;
an identifier that identifies an active window from among the windows; and
a caller that, when an annotation rule associated with the active window that has been identified by the identifier is present in the memory and when the annotation object is selected,
analyzes content of an annotation message, a protocol, and a file extension,
first identifies an annotation target application, which is a program in which the annotation message is displayed,
second identifies an external program to be started from the annotation message based on a combination of a result of the analysis and a result of the first identification, and
calls the external program based on a result of the second identification, wherein
the annotation message is a text file that includes information about the protocol and the file extension, wherein
the caller outputs the annotation message as the annotation object to the external program during starting of the external program.

2. The annotation apparatus according to claim 1, wherein the caller analyzes the annotation message, identifies a program in which the annotation message is displayed and, based on results of the analysis and the identification, calls an external program corresponding to the program.

3. An annotation method performed in an annotation apparatus, the annotation method comprising:
storing, in a memory, an annotation object and an annotation rule applicable to each of windows of the annotation object in an associated manner;
identifying an active window from among the windows; and when an annotation rule associated with the active window that has been identified at the identifying is present in the memory and when the annotation object is selected, analyzing content of an annotation message, a protocol, and a file extension, first identifying an annotation target application, which is a program in which the annotation message is displayed, second identifying an external program to be started from the annotation message based on a combination of a result of the analysis and a result of the first identification, and calling the external program based on a result of the second identification, wherein the annotation message is a text file that includes information about the protocol and the file extension, and the annotation method includes outputting the annotation message as the annotation object to the external program during starting of the external program.

4. A non-transitory computer-readable recording medium storing an annotation program that causes a computer to execute a process comprising:

storing, in a memory, an annotation object and an annotation rule applicable to each of windows of the annotation object in an associated manner;

identifying an active window from among the windows; and when an annotation rule associated with the active window that has been identified at the identifying is present in the memory and when the annotation object is selected, analyzing content of an annotation message, a protocol, and a file extension, first identifying an annotation target application, which is a program in which the annotation message is displayed, second identifying an external program to be started from the annotation message based on a combination of a result of the analysis and a result of the first identification, and calling the external program based on a result of the second identification, wherein the annotation message is a text file that includes information about the protocol and the file extension, and the process includes outputting the annotation message as the annotation object to the external program during starting of the external program.

5. The annotation apparatus according to claim 1, wherein the caller, by calling an automatic operation program on an application program as the external program corresponding to the program to cause the automatic operation program to perform a script associated with an annotation, achieves a one stop operation that takes an action performed by a user on the annotation as a trigger for the automatic operation.

* * * * *